United States Patent [19]
Faltermeier et al.

[11] Patent Number: 5,579,156
[45] Date of Patent: Nov. 26, 1996

[54] PHOTOMICROSCOPE WITH A VIDEO CAMERA AND AN EXPOSURE TIME CONTROL FOR A STILL CAMERA

[75] Inventors: Bernd Faltermeier, Aalen; Franz Trautwein, Aalen-Hofherrnweiler; Bernd Spruck, Mögglingen; Gerhard Herrmann, Aalen; Bernd Meder, Westhausen, all of Germany

[73] Assignee: Carl-Zeiss-Stiftung, Heidenheim, Germany

[21] Appl. No.: 444,342

[22] Filed: May 18, 1995

[30] Foreign Application Priority Data

May 18, 1994 [DE] Germany ............. 44 17 365.2

[51] Int. Cl.⁶ .................................. G02B 21/36
[52] U.S. Cl. ............... 359/363; 348/64; 359/368
[58] Field of Search ................. 359/363, 368, 359/379, 383; 348/64, 69, 73, 79, 70, 71; 354/79, 432

[56] References Cited

U.S. PATENT DOCUMENTS

| | | | |
|---|---|---|---|
| 4,143,938 | 3/1979 | Feinbloom | 359/363 |
| 4,302,087 | 11/1981 | Reinheimer et al. | 359/363 |
| 4,567,478 | 1/1986 | Schwab | 359/368 |
| 4,714,823 | 12/1987 | Spruck et al. | 250/205 |
| 4,716,470 | 12/1987 | Levine | 354/432 |
| 4,814,814 | 3/1989 | Leiter | 354/432 |
| 4,871,245 | 10/1989 | Ishikawa et al. | 359/363 |
| 4,958,920 | 9/1990 | Jorgens et al. | 350/530 |
| 5,276,550 | 1/1994 | Kojima | 359/368 |
| 5,331,419 | 7/1994 | Yamada et al. | 348/64 |

FOREIGN PATENT DOCUMENTS 3410682  9/1985  Germany.

*Primary Examiner*—Timothy P. Callahan
*Assistant Examiner*—Jeffrey Zweizig

[57] ABSTRACT

A photomicroscope includes a port for a still camera (11) and an additional video camera (14). The video image of the video camera (14) serves both for the operation of a passive autofocusing system (23, 24) and for the determination of the exposure time for the still camera (11). The image areas that are used for exposure metering can be selected via a control panel (27). The integration time of the video camera (14) can be varied up to the range of minutes. The selected image areas are superimposed on the object image.

16 Claims, 3 Drawing Sheets

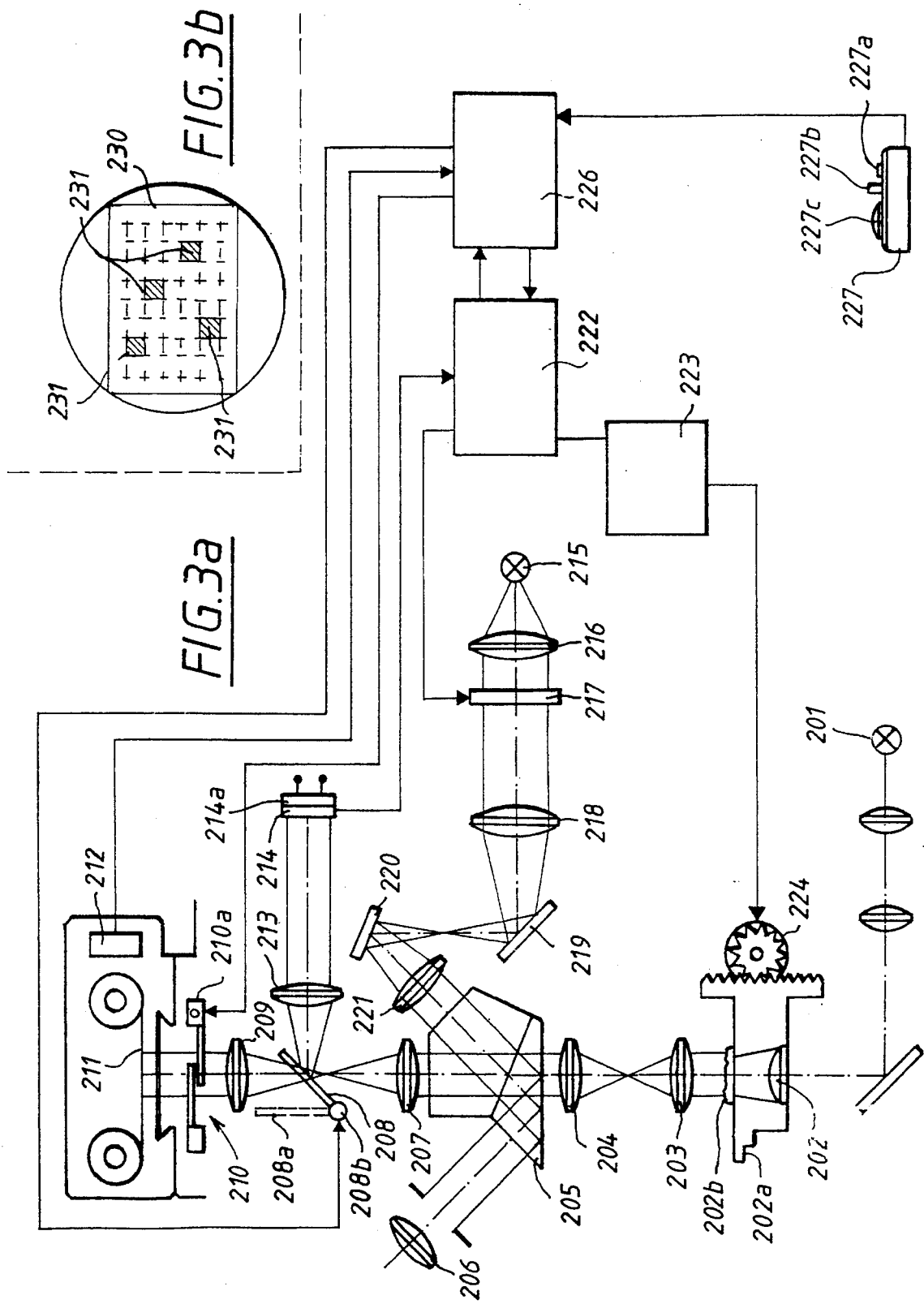

PHOTOMICROSCOPE WITH A VIDEO CAMERA AND AN EXPOSURE TIME CONTROL FOR A STILL CAMERA

BACKGROUND OF THE INVENTION

1. Field of the Invention

This invention relates to a photomicroscope using a still camera for recording microscope images.

2. Relevant Prior Art

The recording of microscope images using a still camera is possible with a photomicroscope. For example, German Patent 34 10 682 and U.S. Pat. No. 4,814,814 describe such photomicroscopes, in which a part of the photo beam path is mirrored onto several detectors, for example a diode array, for exposure metering with spatial resolution. The result of the exposure metering with spatial resolution is then used to determine and control the exposure time of the camera shutter. According to German Patent 34 10 682, the result of the exposure metering, especially of the image areas where the result of exposure metering is unsatisfactory and where insufficient light exposure of the film therefore has to be expected, can be displayed via a liquid-crystal display which can be inserted in the plane of an eyepiece reticle. According to U.S. Pat. No. 4,814,814, a similar result is obtained if the display unit is arranged not directly in the plane of the eyepiece reticle, but mirrored into this plane via a reflector arrangement.

With these photomicroscopes, the information obtained via the detectors is exclusively used for the determination of the correct exposure time of the still camera. It is intended neither to create a video image of the object by means of the detector signals nor to use the detector signals for microscope focusing. Apart from that, the sensitivity of the photo diodes or the diode array will not be sufficient for objects of very poor brightness.

The video microscope with video camera for the recording of a video image and a monitor for the visualization of the video image is know from U.S. Pat. No. 4,958,920. With this previously known video microscope, the video signals are also used for passive autofocusing based on the contrast of the video image. A passive autofocus system has, in fact, only a relatively small capture range, i.e., the object must already be relatively well focused in the first place to allow the autofocus to work. On the other hand, however, such a passive autofocus system features very precise focusing and its capture range is fully sufficient to compensate for the influence of minor object unevenness or the drift occurring in observation over a long period of time. Here, observation of the object is possible either via the eyepieces or via the monitor. However, an exposure of the microscope image using a still camera is not provided.

Furthermore, it is known, of course, that autofocus microscopes, e.g., according to U.S. Pat. No. 4,958,920 or the microscope offered by Applicant's assignee Carl Zeiss, under the name Axiotron AF described, for example, in Carl Zeiss' brochure marked CM-TS-II/87 Uoo, can be additionally equipped with a microscope camera, e.g., Carl Zeiss' "MC 100". In such instrument combinations, however, both the optical and the mechanical components of the autofocus system and the microscope camera are independent of each other. A separate detector for exposure metering is provided in the camera attachment.

SUMMARY OF THE INVENTION

The aim of the invention is to create a photomicroscope in which the exposure metering of the still camera can be adapted to different brightness conditions in the microscope image with great flexibility.

This aim is achieved with a photomicroscope with a camera port for attachment of a still camera, a video camera for recording a microscope image as a video image, and a control switching device for determining required exposure time of the still camera by means of the video image.

The photomicroscope according to the invention therefore comprises a camera port for the adaptation of a still camera and includes a video camera to record the microscope image. The video image recorded with the video camera is used to determine the required exposure time of the still camera. The video signal is guided to a control circuit, which controls the electrical shutter of the microscope camera.

The video signal can also be used for self-acting focusing on the object in the focal plane of the microscope objective via a passive autofocus system based on the image contrast. The microscope according to the invention therefore requires only one video camera for the autofocus system and for exposure metering.

The video camera should be designed for two-dimensional image recording and comprise a variety of light-sensitive areas which are independent from each other. Preferably, the control circuit contains input means for the selection of those light-sensitive areas on which the determination of the exposure time shall be based. This permits the observer to select the object areas of particular interest for exposure metering, which ensures that these object areas are suitably exposed. For this, the observer should be able to choose from at least three areas of different size in the image center and from further averaging over the entire image. However, it will be much more advantageous if the user can choose any required image area for exposure metering.

It has proven to be particularly user-friendly if the brightest image area or areas of the video image are picked out automatically by the image processor in an operating mode of the exposure meter, e.g., by using an image-processing software, and the brightness in these image areas is used to determine the exposure time of the still camera. This method ensures a high degree of automation in exposure metering, while optimum exposure results are achieved at the same time in most cases.

Furthermore, means for the superimposed visual display of the object image and those image areas on which the determination of the exposure time has been based, are provided in an advantageous embodiment of the invention. This permits the user to check and, if required, correct the selection any time.

The superimposed visual display can be implemented, for example, on a monitor, which shows the microscope image recorded with the video camera and on which the selected image areas are marked, for example in red or by highlighting.

The monitor can be either external or integrated into the microscope, the latter with the monitor image being imaged into the microscope eyepieces. In the latter case, only the selected image areas need to be displayed on the monitor, of course. Because the object is visible in the eyepieces anyway, the superposition of the same image, recorded by the video camera, is not required. Compared with the use of an external monitor, this embodiment has the advantage that the user need not turn his head away from the eyepieces for input or checking of the selected areas.

As an alternative to the reflection of a monitor image, a fixed reticle can also be imaged in the eyepieces which displays the image area recorded by the camera. If the image area used for exposure metering can be shifted within the microscope image as required, a light point complying with the image area used for exposure metering should also be reflected into the reticle plane.

To permit the suitable exposure time to be determined even in the case of very different brightness levels of the microscope image, the integration time of the video camera should be variable. A simple switching operation, which extends the time between readouts of the video camera to several video cycles, is sufficient for this. Furthermore, the video camera may be cooled to enable a sufficient signal-to-noise ratio also with very long integration times which are required, for example, with weak fluorescence images.

To enable both exposure metering and photography even of objects of very poor brightness, a switchable, fully reflective mirror should be provided in the photo beam path, with the entire light being directed to the still camera in one mirror position and to the video camera in the other mirror position. The reticle or the monitor image should be coupled to the photo beam paths either between the switchable mirror and the prisms splitting between the ocular beam paths and the photo beam paths or, more preferably, directly at this prism. The measuring beam path for exposure metering and the beam path for imaging of the reticle or the monitor image are therefore separated from each other, i.e., switchover from exposure metering to checking of the selected image areas is not required. Furthermore, the video signal will also be available for autofocusing when the user checks the image areas selected for exposure metering. The autofocus is switched off during the film exposure or during the integration of the video signal over several video cycles, since no current video signal is available during that time.

DESCRIPTION OF THE DRAWINGS

In the following, details of the invention are explained by means of detailed descriptions of preferred embodiments, with reference to the drawings in which:

FIG. 2b is a monitor image in an embodiment according to FIG. 2a.

FIG. 3a is a schematic design of a further embodiment, with the monitor being imaged into the eyepieces, and FIG. 3b is a schematic design of an image visible in the microscope eyepieces in an embodiment according to FIG. 3a.

DESCRIPTION OF PREFERRED EMBODIMENTS

Figure 1:
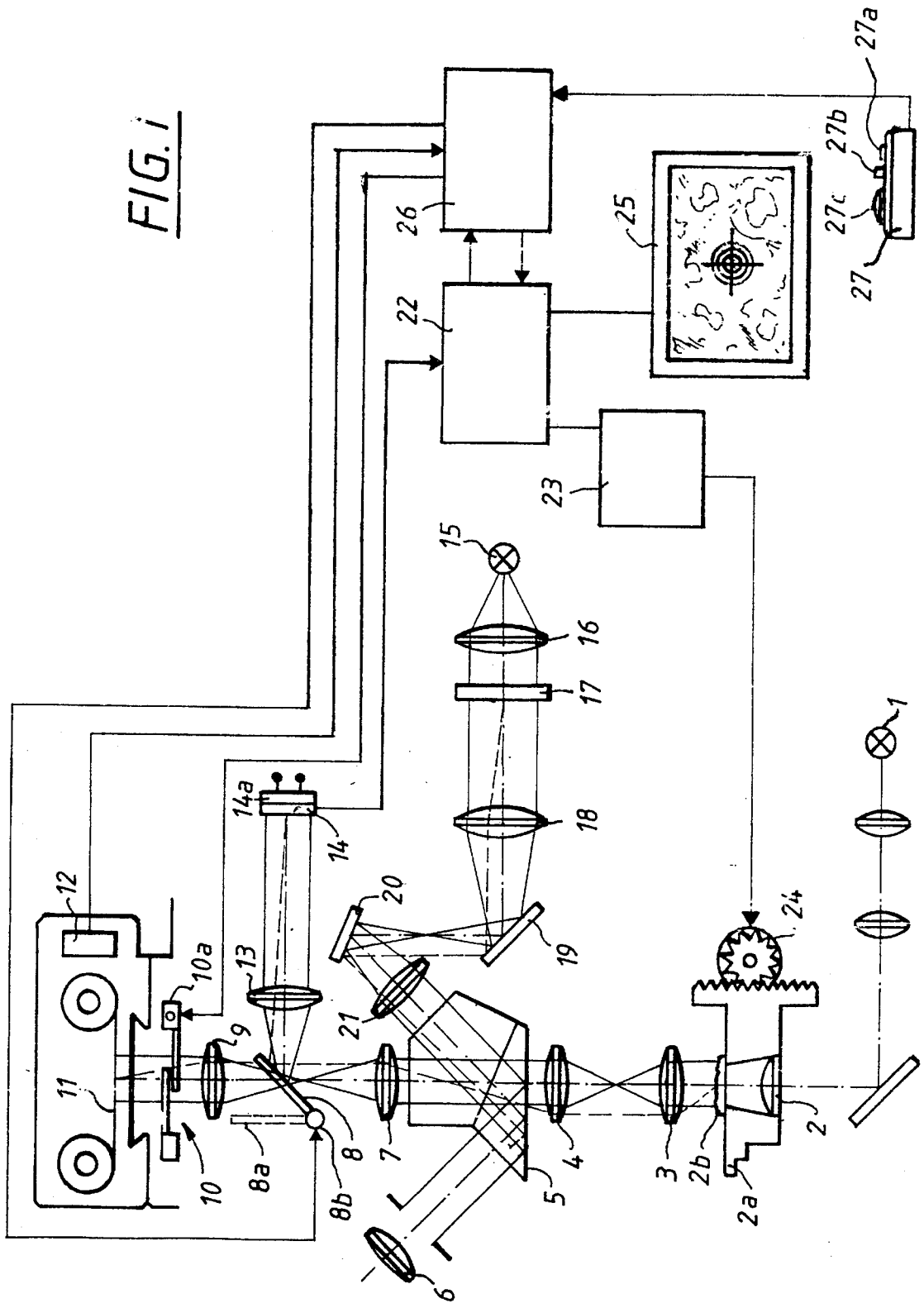
FIG. 1 is a schematic design of a first embodiment of the invention with a superimposed design of the microscope image and the areas selected for exposure metering on an external monitor.

The microscope in FIG. 1 comprises an object stage (2a), adjustable in height for focusing, with a condenser lens (2) mounted thereupon. FIG. 1 includes a transmitted-light illumination (1) provided to illuminate the object (2b) lying on the object stage (2a). However, the invention can also be applied with a reflected-light microscope, where the illuminating beam path is deflected into the direction of the object (2b) between the objective (3) and the tube lens (4). However, this reflected-light beam path has not been included in the drawing for reasons of greater clarity.

The objective (3) and the following tube lens (4) provide a real image of the object (2b). A beam splitting prism (5), which directs a portion of the observation beam path to the eyepieces (6) and the other portion to the camera attachment, is provided behind the tube lens (4), seen in the direction of the light. The real image of the object created in the eyepiece beam path can be viewed through the eyepieces (6). The intermediate image created in the photo beam path in or behind the prism (5) is imaged to infinity at first by the following imaging optics (7) and, behind a switchable mirror designed as a folding mirror (8), is then directed alternatively in the direction of the still camera, of which only the film (11) is shown here, or to the CCD camera (14). Two camera objectives (9, 13) arranged in the appropriate beam path create real images of the object (2b) in different reproduction ratios either on the film (11) or on the CCD camera (14).

In the situation shown in FIG. 1, in which the folding mirror (8) is inserted into the beam path, the entire light of the photo beam path is directed to the CCD camera (14). In the second switching position, shown in a broken line and marked with (8a), however, the entire light of the photo beam path is let through to the film (11). An electrical drive is provided for the operation of the switchable mirror (8).

A second light entry surface of the beam splitting prism (5) permits a photo reticle (17), illuminated via an additional light source (15) and a collector (16), to be imaged into the eyepieces (6) via imaging optics (18, 21) and path-deflecting mirrors (19, 20). The reflection of the photo reticle (17) helps the user to align the object areas of interest to the available format of the still camera (11) in the known way.

The video signals of the CCD camera (14) are directed to an image processor (22) first. An exit of the image processor (22) is connected to the autofocus module (23). In the autofocus module (23), video images which are read out one after the other are stored and compared with each other, and a drive signal for the electrical focusing drive is gained from the result. The design of the autofocus module (23) and the operations running in it comply with the passive autofocus system from U.S. Pat. No. 4,958,920 mentioned in the beginning, i.e., these details need not be dealt with here again. For the details of the autofocus module please see the aforesaid patent, which is incorporated herein by reference.

The exposure control (26) is connected to the image processor (22). The exposure control (26) receives information on the speed of the inserted film (11) from the code sensor (12). Furthermore, the exposure control (26) receives information on the areas of the video image taken with the video camera (14), which are to be used for exposure control. Via switching knobs (27b) on the control panel (27), the user can choose whether the entire video image shall be used for exposure control or only an image area of alternatively 1%, 3% or 10% of the entire image surface. This image area can be shifted within the video image by means of the track ball (27c) of the control panel (27). The position of the selected image area set via the track ball (27c) is shown in the superimposed display on the monitor (25).

In a further mode, the brightest area of the video image is automatically selected by the image processor (22), and information on the position of this area is transferred to the exposure control (26).

Depending on which of these 5 modes for exposure metering is chosen by the user, the exposure control (26) uses only those video signals for exposure metering which belong to the appertaining image areas. Here, the relevant light measuring value can simply be the average value of the brightness of the camera pixels within the selected areas.

The exposure control (26) transfers the image area selected for exposure metering to the image processor (22). Here, the video signal from the CCD camera (14) is mixed with the signals coming from the exposure control (26) and a superimposed display of the microscope image is created on a monitor (25). In this superimposed image, the image areas selected for exposure control have been marked, for example by colors. Furthermore, the exposure time determined by the exposure control (26) is displayed in a bottom bar of the monitor not shown in the figure.

If the image is released via the key (27a) on the control panel (27), the exposure control (26) will deliver a control signal to the autofocus module (23) via the image processor (22), by which the autofocus will be switched off during the film exposure. After the switch-off of the autofocus, the exposure control switches the folding mirror (8) into the position shown as a broken line (8a) and opens the electrical central shutter (10), the electrical drive of which is marked with (10a), for the duration of the determined exposure time. After the exposure, the folding mirror swings back into the beam path and the exposure control (26) gives a further impulse to the autofocus module (23), which puts the autofocus in operation again.

To ensure that the exposure control works reliably also in the case of objects of very poor light brightness, e.g., the exposure of fluorescence images, the frequency with which the CCD camera (14) is read out by the image processor (22) is variable due to a so-called electronic shutter. Normally, the image processor (22) reads out the CCD camera (14) with the usual TV frequency. However, if the video signals in the selected image areas are too low, the readout frequency for the CCD camera is reduced to one quarter of the video frequency and the integration time of the CCD camera prolonged accordingly to four cycles. If the video signal is still too low even after this quadrupled integration time, the readout frequency is reduced again by the factor 4 so that the integration time now amounts to 16 times the usual video cycles. These steps are repeated until the video signal is sufficient for reliable exposure metering. In the case of objects of particularly poor brightness, integration times of the CCD camera of more than one minute are obtained. The sensitivity of the CCD camera is then identical to that of a photomultiplier. To avoid the actual video signal to be masked by noise also in the case of such long integration times, the CCD camera is cooled. For this, the camera module is mounted on a Peltier element (14a).

During the integration of the CCD camera lasting over several video cycles, or during the exposure of the film (11), the image-processor (22) delivers a still image of the video image taken last on the monitor, together with the information received from the exposure control (26), to enable the user to view the monitor image also during that period of time.

Figure 2A:
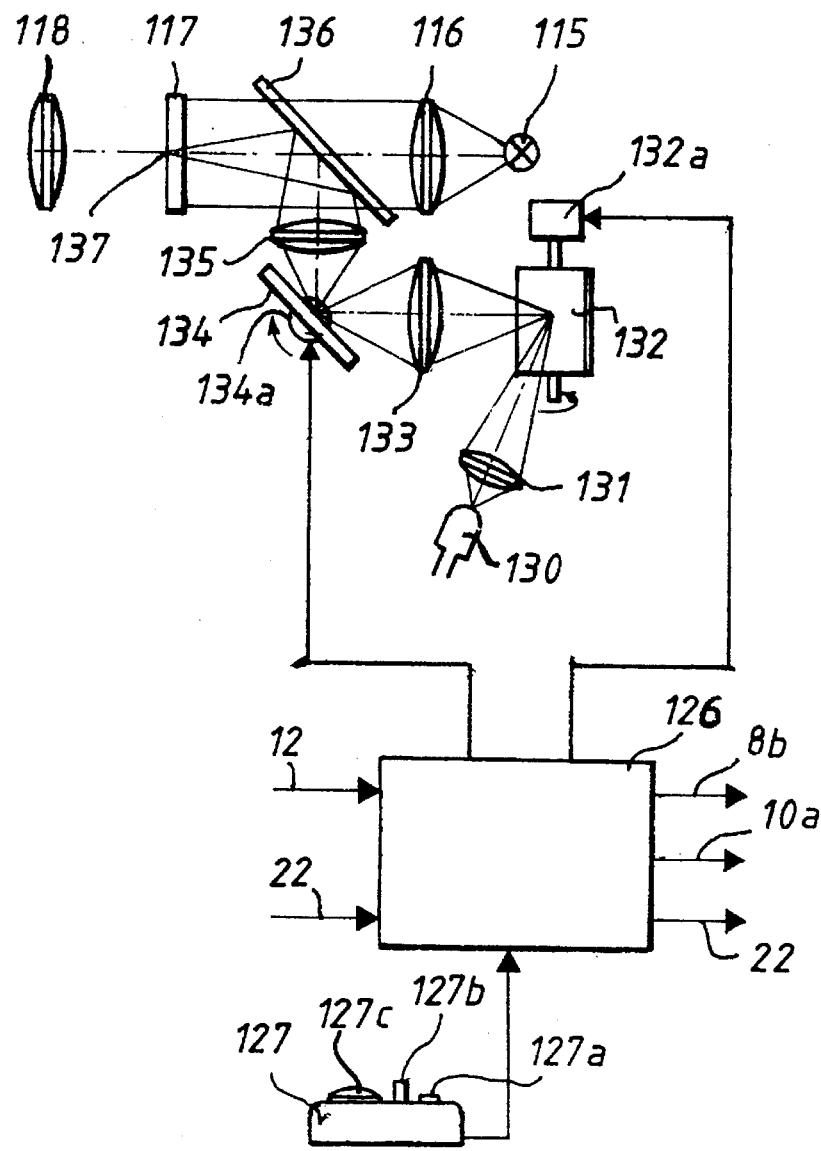
FIG. 2a is a detailed design of a second embodiment, showing a movable luminous point imaged into the plane of the reticle.
Figure 2B:
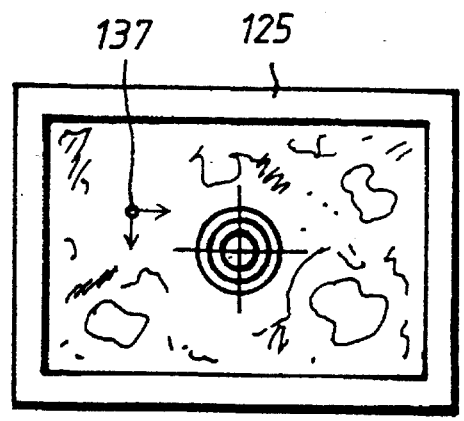

In the embodiment according to FIGS. 2a and 2b, the position of the image area for exposure metering set via the track ball (127c) is displayed to the viewer also in the eyepieces (6). For this, only the components of the reticle beam path (light source (15), collector (16), reticle (17) and imaging optics (18)) according to FIG. 1 must be replaced with the arrangement according to FIG. 2a. Here, the components corresponding to those in FIG. 1 have just been assigned with reference numbers higher by 100. A beam splitter (136) is arranged here between the reticle (117) and the collector (116), via which a light emitting diode (130) is imaged in the plane of the reticle (117). The image of the light emitting diode (130) in the plane of the reticle (117) is marked with (137). The reflection of the light emitting diode (130) is performed via two mirror (132, 134) rotatable around two axes perpendicular to each other and via imaging optics (131, 133, 135). Depending on the set position of the track ball (127c) of the control panel (127), the exposure control (126) produces corresponding signals for the drive motors (132a, 134a) of the appropriate swing-in mirrors (132, 134), so that the position of the light emitting diode image (137) complies with the position of the image area selected for exposure metering.

If the image area to be used for exposure metering is automatically selected via the image processor (22), the drive motors (132a, 134a) are automatically controlled in such a way that the image of the light emitting diode complies with the selected image area. Apart from that, the embodiment according to FIG. 2a and 2b is identical with the embodiment according to FIG. 1.

The embodiment according to FIG. 3a and 3b also largely complies to the embodiment according to FIG. 1 with regard to the design of the optical components. Here, the components corresponding to the arrangement according to FIG. 1 have been assigned with reference numbers higher by 200. In the following, only those components will be dealt with in detail which differ from the embodiment according to FIG. 1.

In the embodiment according to FIG. 3a and 3b, any required number of image areas distributed over the image field can be selected for exposure metering as required. The appropriate image areas are controlled by operating the track ball (227c) of the control panel (227) and marked by operating the key (227b). After that, the next image detail can be approached using the track ball (227c) and marked. This procedure is repeated until all the object details to be used for exposure metering have been marked appropriately.

In this embodiment, an LCD-display (217), illuminated from behind, which serves as a monitor and which is imaged into the eyepieces (206), is arranged instead of a reticle. The image processor (222) highlights those image areas on the LCD display (217), which comply with the image areas selected for exposure metering.

The image visible to the observer on looking in the eyepieces is shown in FIG. 3b. The frame or the LCD display indicates the format of the film (211). The image section captured by the camera is designated with (230) in FIG. 3b. The image areas selected for exposure metering, of which four are shown here, are designated with (231).

As regards the relative assignment of pixels of the CCD camera (214) and the detail fields of the LCD display (217), it should be mentioned that the appropriate numbers do not have to be identical. For example, it is standard practice to use a commercial camera chip with 256×256 light-sensitive pixels for the CCD camera, and a display with 10×10 detail fields, each amounting to 1% of the entire surface of the LCD display, for the LCD display (217). In this case, with a detail field of the LCD display being highlighted, the video signals of all the pixels lying within the detail field of the CCD camera (214) are used for exposure metering. The use of an LCD display (217) with less than 200 detail fields is even advantageous because otherwise too many single fields would have to be marked by the user.

Furthermore, it is not absolutely necessary to mark each individual detail measuring field. When the selection key (227b) is pressed, a circumscribed area can be traced using the track ball (227c) which, in its entirety, is then taken as the basis for exposure metering when the key (227b) has been released.

It is also possible to image a miniature monitor into the eyepieces instead of the LCD display (217). This also permits any points on the monitor image to be approached by operating the track ball (227c) and partial areas covering 1/100 of the entire image surface of the monitor to be selected by operating the selection key (227b). Alphanumeric data can then also be imaged simultaneously into the microscope eyepiece by means of the monitor. Since microscopes for special applications are nowadays often equipped with an additional table computer (Personal Computer, notebook), which controls a part of the microscope functions, a part of the operations described can also be performed by such a computer. In this case, the control panel (227) is not necessary. The selection of the image areas to be used for exposure metering and the selection of the mode for exposure metering is then performed either by means of the computer mouse or the cursor keys of the computer keyboard. In the alternatives to the embodiments described, the function of the control panel can therefore also be performed by input means of a computer.

We claim:

1. A photomicroscope comprising an objective (3; 203) through which a light beam path passes, a camera port for attachment of a photographic still camera (11, 12; 211, 212), to which said light beam path leads from said objective, a shutter (10; 210) arranged in said light beam path, a video camera (14; 214) for recording a microscope image as a video image and generating output signals and a control switching device (26; 126; 226) for determining required exposure time of said photographic still camera (11, 12; 211, 212) in response to said output signals from said video camera and for opening said shutter for said required exposure time.

2. A photomicroscope according to claim 1, further comprising a microscope objective and a passive autofocusing system (23, 24; 223, 224) for automatic focusing of an object (2b; 202b) in a focal plane of said microscope objective (3; 203) by means of signals generated from said video image.

3. A photomicroscope according to claim 1, wherein said video camera (14; 214) comprises a CCD camera with a plurality of light-sensitive areas, independent of each other, further comprising input means (27; 127; 227) connected to said control switching device for selection of light-sensitive areas on which a determination of exposure time is based.

4. A photomicroscope according to claim 3, wherein said input means (27; 127; 227) comprises means for selecting from at least three different image areas of said video image.

5. A photomicroscope according to claim 3, further comprising an image processor (22; 222) equipped with an image-processing program for selecting brightest area(s) of said video image, wherein only image areas selected in this way are used for exposure control.

6. A photomicroscope according to claim 3, further comprising visual display means (25; 130–136; 217) for superimposing visual display of an object image and image areas or light-sensitive areas on which a determination of exposure time is based.

7. A photomicroscope according to claim 6, wherein said visual display means comprises a monitor (25; 125; 217).

8. A photomicroscope according to claim 6, further comprising eyepieces (206) and imaging means for imaging a visual display image into said eyepieces (206).

9. A photomicroscope according to claim 6, further comprising eyepieces (6), a reticle (117), imaging means for imaging said reticle into said eyepieces, and imaging means for imaging a light point in a plane of said reticle (117) to display a position of an image area on which a determination of exposure time is based.

10. A photomicroscope according to claim 1, wherein said video camera (14; 214) comprises a sensor with a cooling device (14a; 214a).

11. A photomicroscope according to claim 1, further comprising time variation means (26; 126; 226) for varying integration time of said video camera (14; 214).

12. A photomicroscope according to claim 1, further comprising a photo beam path for guiding at least a part of said light of said microscope beam path either to said still camera or to said video camera and a switchable mirror having a first switching position for directing all light in said photo beam path to said still camera and a second switching position for directing all light in said photo beam path to said video camera.

13. A photomicroscope according to claim 12, further comprising eyepieces, a beam-splitting prism for directing a part of said light of said microscope beam path to said eyepieces, a reticle or a monitor generating a monitor image, imaging optics for imaging said reticle or said monitor image and defining a monitor beam path, and incoupling means for coupling said monitor beam path to said photo beam path, wherein said incoupling means are positioned between said switchable mirror and said beam splitting prism.

14. A photomicroscope according to claim 12, further comprising eyepieces, a beam-splitting prism for directing a part of said light of said microscope beam path to said eyepieces, a reticle or a monitor generating a monitor image, imaging optics for imaging said reticle or said monitor image and defining a monitor beam path, wherein said monitor beam path is coupled to said photo beam path at said beam-splitting prism.

15. A photomicroscope comprising a camera port for attachment of a still camera (11, 12; 211, 212), a video camera (14; 214) for recording a microscope image as a video image, and a control switching device (26; 126; 226) for determining required exposure time of said still camera (11, 12; 211, 212) by means of said video image, wherein said video camera (14; 214) comprises a sensor with a cooling device (14a; 214a).

16. A photomicroscope comprising a camera port for attachment of a still camera (11, 12; 211, 212), a video camera (14; 214) for recording a microscope image as a video image, a control switching device (26; 126; 226) for determining required exposure time of said still camera (11, 12; 211, 212) by means of said video image, and a time variation device (26; 126; 226) for varying integration time of said video camera (14; 214).

\* \* \* \* \*